(No Model.)

J. L. BOGERT.
PLUNGER FOR STEAM AND VAPOR ENGINES.

No. 309,686.      Patented Dec. 23, 1884.

Witnesses
Chas. H. Smith
J. Staib

Inventor
John L. Bogert
per Lemuel W. Serrell
atty

N. PETERS, Photo-Lithographer, Washington, D. C.

UNITED STATES PATENT OFFICE.

JOHN L. BOGERT, OF FLUSHING, NEW YORK.

PLUNGER FOR STEAM AND VAPOR ENGINES.

SPECIFICATION forming part of Letters Patent No. 309,686, dated December 23, 1884.

Application filed June 25, 1884. (No model.)

*To all whom it may concern:*

Be it known that I, JOHN L. BOGERT, of Flushing, in the county of Queens and State of New York, have invented an Improvement in Plungers for Steam and Vapor Engines, of which the following is a specification.

Engines have been made with hollow plungers containing the wrist-pin for the connecting-rod to the crank; but difficulty has heretofore arisen in oiling the wrist-pin and the plunger, especially in engines that require to be driven continuously night and day, and in which the cylinder occupies a horizontal position. I make use of a plunger that is longer than the stroke of the engine, and I provide packings or bearings for the plunger against the interior of the cylinder, near the ends of the plunger, and I introduce an oiler through the cylinder in such a position in relation to the plunger that the packings of the piston do not pass by the oiler; hence the oil is held between the two packings to lubricate the plunger, and the wrist-pin is constructed so as to be removable, and there are openings for the oil to pass through and lubricate the wrist-pin for the connecting-rods.

Figure 1:
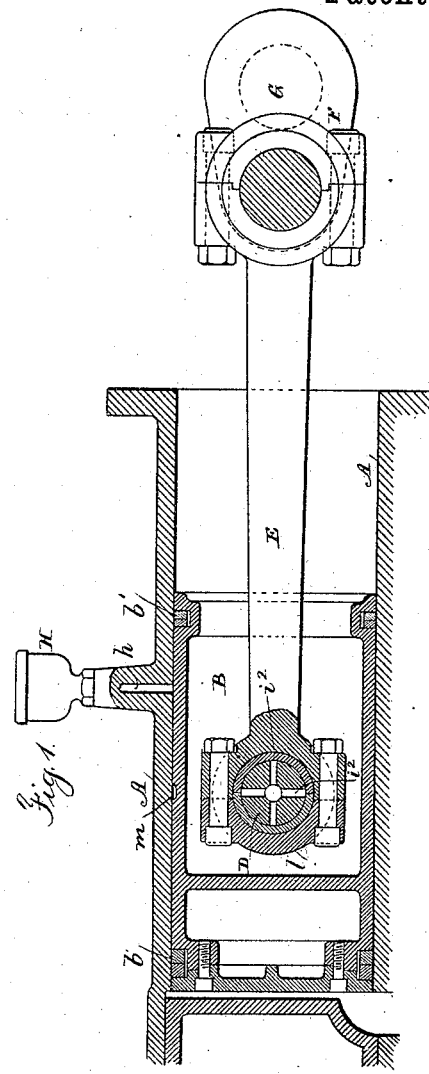
Figure 2:
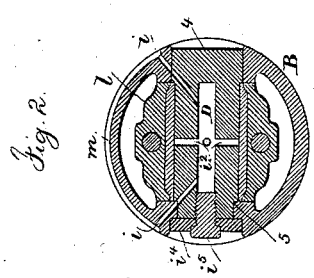

In the drawings, Figure 1 is a longitudinal section of the cylinder and the plunger, and Fig. 2 is a transverse section of the plunger.

The cylinder A is of any desired character. It is shown in a horizontal position, as my improvement is especially available with a horizontal engine, but might be used with a vertical engine. The plunger B is provided with bearings or packings at $b\ b'$, which cause the piston to be tight within the cylinder. These packings may be of metal or flexible material introduced into the peripheral grooves near the ends of the plunger, and provided with followers to set up the packings, as usual in steam-engine pistons; or deep narrow grooves may take the place of the packings. In this case the plunger bearing against the interior of the cylinder, where the peripheral grooves are formed, will be sufficiently tight for the fluid made use of in the cylinder; but the packings are preferable to the grooves. The distance between the packings or bearings is to be as great as the distance which the plunger moves. I have shown the wrist-pin D in the plunger, the connecting-rod E, and the crank F to the shaft G as the means for determining the distance which the plunger moves. The oil-cup H and tube $h$, leading in laterally through the cylinder A, form the devices that supply the lubricating material. There may be a cock in the tube $h$, to regulate the supply of lubricating material, or the oil may be introduced periodically into or continuously from the cup. The lubricating material, being between the two packings $b\ b'$, is confined, but it lubricates such packings; and I provide holes $i$, that pass laterally from the exterior of the plunger into the hollow wrist-pin, and there are cross-holes $i^2$, through which the oil passes to the surface of the pin, to lubricate the same, and also to lubricate the surfaces of the box $l$, which is at the inner end of the connecting-rod E, and surrounds the wrist-pin. The wrist-pin is made with a head at 4 and a shoulder at 5, which take bearings against the recesses formed for them in the plunger, and there is a washer, $i^4$, and screw $i^5$, that serve to hold the wrist-pin firmly into its place, but which allow of its removal. It is usually preferable to make the inner end of the connecting-rod with a box, into which Babbitt metal is cast around the wrist-pin. This allows the connection to be made by inserting the wrist-pin through the plunger and through the end of the connecting-rod before the plunger is inserted into the cylinder. It is preferable to groove the upper surface of the plunger between the holes $i\ i$, as at $m$, so that this groove will receive the oil as it passes along below the tube $h$, and deliver it through the holes $i$ and $i^2$ to the wrist-pin and the surfaces to be lubricated.

I claim as my invention—

1. The combination, with the engine-cylinder, of a plunger having packings near each end, and being of a length greater than the stroke of the engine, and an oil-supply cup opening into the space between the packings, substantially as set forth.

2. The cylinder and hollow plunger, in combination with the connecting-rod, and a wrist-pin passing across the plunger, and oil-supply openings passing from outside the plunger through the wrist-pin, substantially as set forth.

3. The combination, with the cylinder and oil-supply cup, of a hollow plunger having a groove upon its upper surface, and oil-supply openings, and a wrist-pin with the oil-passages in the same, substantially as set forth.

Signed by me this 16th day of June, A. D. 1884.

JOHN L. BOGERT.

Witnesses:
 WILLIAM G. MOTT,
 HAROLD SERRELL.